(12) United States Patent
Dance

(10) Patent No.: US 6,310,553 B1
(45) Date of Patent: Oct. 30, 2001

(54) POSITIONING MEANS

(76) Inventor: Adrian Peter Dance, Rd 2, State Highway 8, Dumbarton, Roxburgh, Central Otago (NZ)

( * ) Notice: Subject to any disclaimer, the term of this patent is extended or adjusted under 35 U.S.C. 154(b) by 0 days.

(21) Appl. No.: 09/619,074

(22) Filed: Jul. 17, 2000

(51) Int. Cl.[7] .................................................. G08B 23/00
(52) U.S. Cl. ................................. 340/573.3; 340/573.1; 340/539; 119/718; 119/721
(58) Field of Search ......................... 340/573.1, 573.5, 340/539, 825.76; 119/720, 822, 718, 721, 712, 792, 859, 908; 455/100, 352; 73/493, DIG. 3; 361/232

(56) References Cited

U.S. PATENT DOCUMENTS

| | | | |
|---|---|---|---|
| 3,336,530 | * | 8/1967 | Sloan .................................. 340/573.3 |
| 4,399,432 | * | 8/1983 | Lunn ..................................... 340/573 |
| 4,737,774 | * | 4/1988 | Chapman ............................. 340/573 |
| 5,815,077 | * | 9/1998 | Christiansen ........................ 340/573 |
| 5,857,433 | * | 1/1999 | Files ..................................... 340/573 |
| 5,900,818 | * | 5/1999 | Lemenll ............................ 340/573.3 |
| 5,911,199 | * | 6/1999 | Farkas .................................. 119/859 |
| 6,067,018 | * | 5/2000 | Skelton ............................. 340/573.3 |

* cited by examiner

Primary Examiner—Daniel J. Wu
Assistant Examiner—Anh La
(74) Attorney, Agent, or Firm—Klauber & Jackson

(57) ABSTRACT

According to one form of the invention, and with reference to FIG. 1, there is provided a positioning means. The positioning means comprising a global positioning system (GPS) 1 and a switch means 2. The GPS 1 and the switch means 2 are carried by a search and rescue dog 4 by way of a harness or jacket 3. The switch means incorporates a pull mechanism or a sound sensitive mechanism which activates the switch mechanism 2 when the dog 4 pulls the pull mechanism or barks. This causes activation of the GPS 1 to record and/or transmit information to identify the position of the positioning means, and thus a person, animal, substance, or article found by the dog.

25 Claims, 5 Drawing Sheets

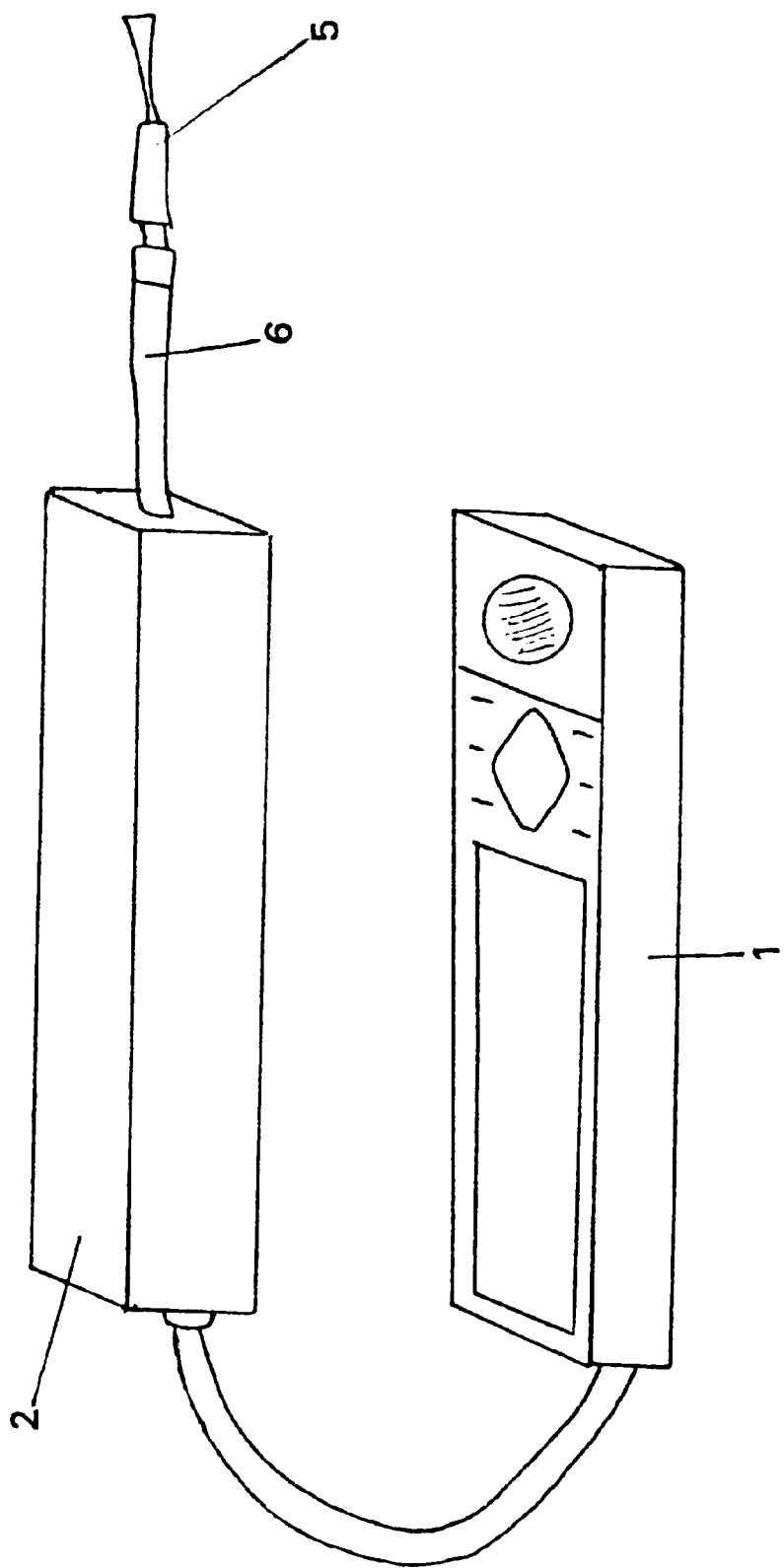

POSITIONING MEANS

FIELD OF THE INVENTION

This invention relates to positioning means. In particular, a preferred aspect of the invention relates to a dog activated GPS (global positioning system).

In the context of search and rescue operations it is known to use a dog to locate a lost or injured person, or to locate a lost animal, substance, or article. A problem with such operations is that at times a dog may locate the person, animal, substance, or article concerned, but fail to communicate this to a dog handler. In some cases the dog is unwilling to communicate the position of the person, animal, substance, or article, and has no interest in returning to the position at which the person, animal, article, or substance was found. It is accordingly an object of at least one form of the present invention to go at least some way towards addressing this problem.

The terms comprise, comprises, and comprising as used herein should be interpreted in a non-exclusive way —ie the terms convey "consisting of or including".

SUMMARY OF THE INVENTION

According to one form of the invention there is provided positioning means, comprising switch means which can be activated by a dog to cause the positioning means to record and/or transmit information to identify the position of the positioning means, the switch means comprising:

i) a pull mechanism which can be pulled by the dog to activate the positioning means to record and/or transmit the information, and/or ii) a sound sensitive mechanism which can be activated by the dog barking to activate the positioning means to record and/or transmit the information.

Preferably the positioning means comprises a GPS.

Preferably the switch means can be activated only in response to the dog barking in a certain way in terms of the frequency or volume of the barking.

Preferably the pull mechanism comprises a tag portion which can be pulled by the dog's mouth to activate the switch means.

Preferably the pull mechanism comprises a pull cord which can be pulled by the dog's mouth to activate the switch means.

Preferably the positioning means is arranged to automatically periodically record and/or transmit the information to identify the position of the positioning means once the switch means has been activated.

Preferably the positioning means incorporates a jacket or harness which can be: worn by the dog to carry the rest of the positioning means.

Preferably the positioning means comprises audible signal means arranged to give an audible signal to the dog when the switch means has been activated by the dog.

Preferably the positioning means comprises transmitter means arranged to fall to ground level and send a position identifying signal when the switch means is activated.

Preferably the positioning means is such that it can be activated automatically by receiving a signal transmitted from a location remote from the positioning means.

According to another aspect of the invention there is provided positioning means, comprising switch means which can be activated by a dog to cause the positioning means to record and/or transmit information to identify the position of the positioning means, the switch means comprising:

i) a pull mechanism which can be pulled by the dog to activate the positioning means to record and/or transmit the information,. and/or ii) a sound sensitive mechanism which can be activated by the dog barking to activate the positioning means to record and/or transmit the information, the positioning means comprising a jacket or harness which can be worn by the dog to carry the rest of the positioning means.

According to a further aspect of the invention there is provided a method of locating a person, animal, article, or substance, comprising the steps of:

a) fitting a positioning means to a dog, the positioning means comprising switch means which can be activated by the dog to cause the positioning means to record and/or transmit information to identify the position of the positioning means, and b) instructing the dog to search out the person, animal, article or substance so that the dog activates the switch means on finding the person, animal, article, or substance, such that the positioning means records and/or transmits information to identify the position of the person, animal, article, or substance.

Some preferred aspects of the invention will now be described by way of example, and with reference to the accompanying drawings, of which:

BRIEF DESCRIPTION OF THE DRAWINGS

FIG. 2 is a perspective view of at least part of the positioning means.

DETAILED DESCRIPTION

Figure 1A:
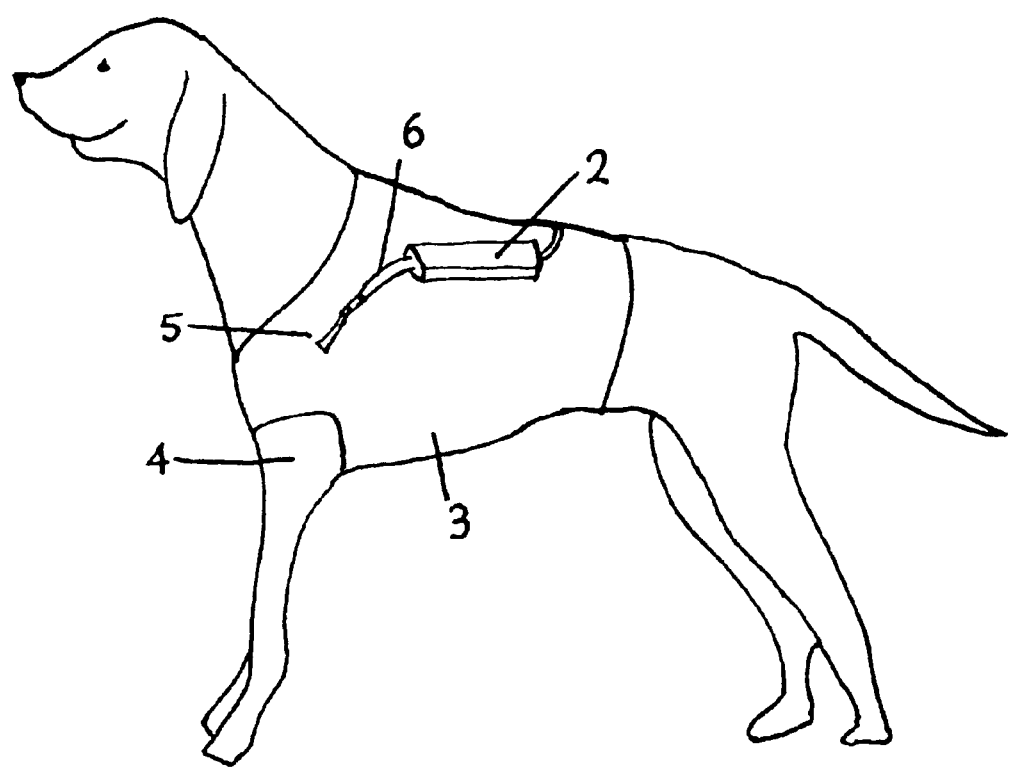
FIG. 1A is a left facing side view showing a dog fitted with positioning means.
Figure 1B:
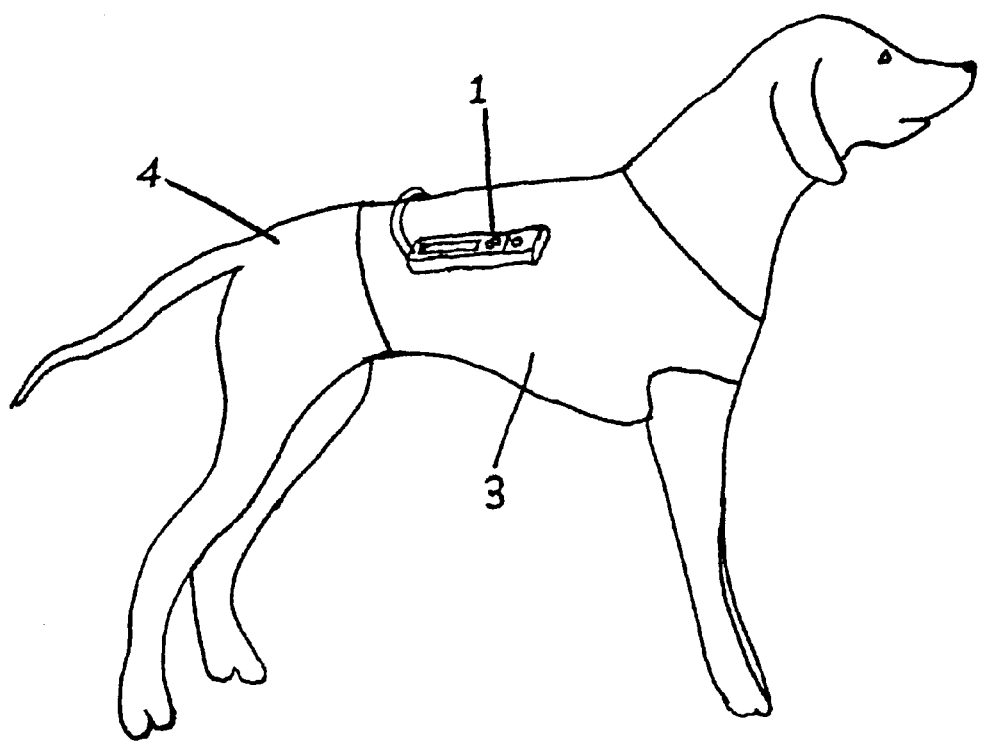
FIG. 1B is a right facing side view showing the dog fitted with the positioning means.
Figure 1C:
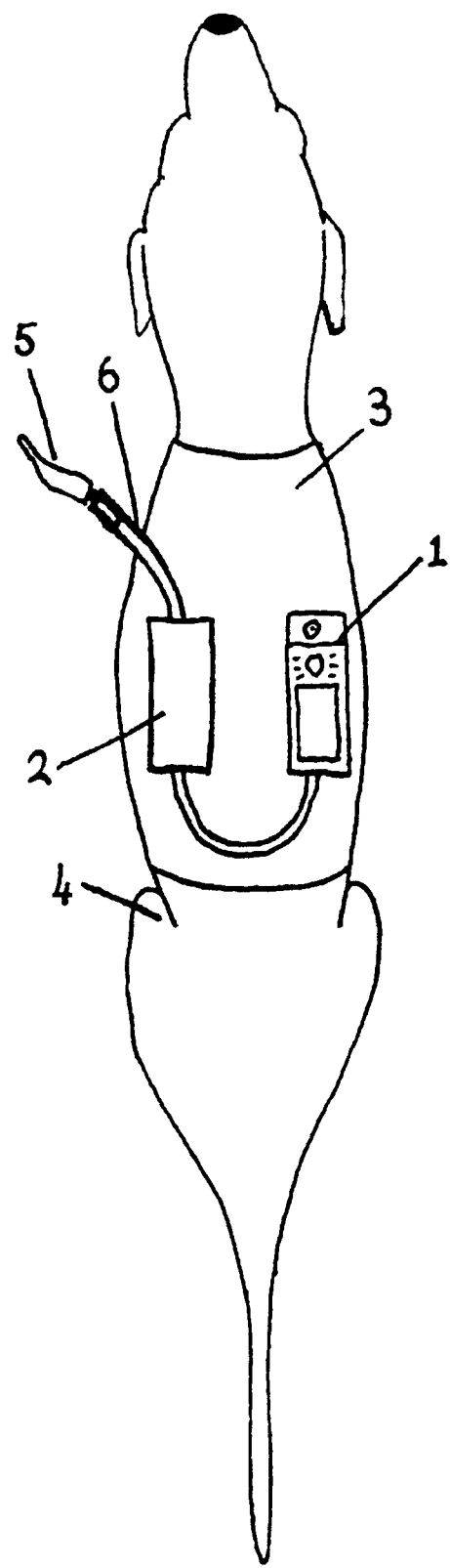
FIG. 1C is an overhead view of the dog fitted with the positioning means.
Figure 1D:
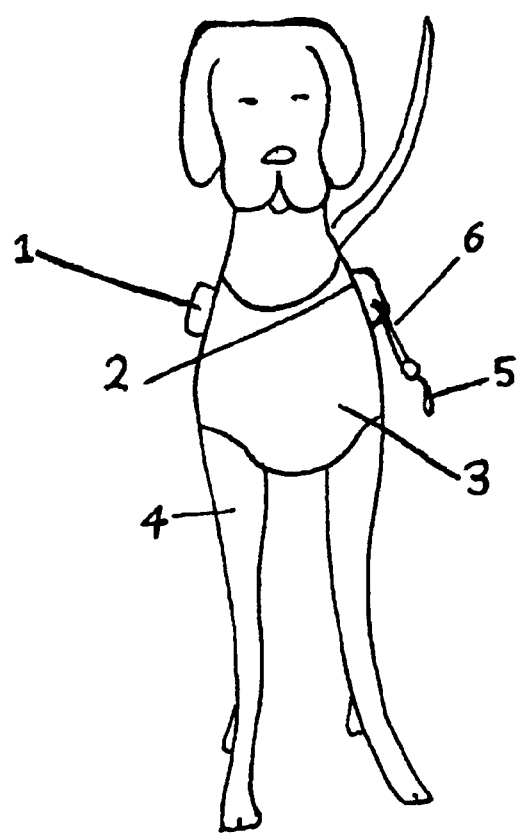
FIG. 1D is a front on view of the dog fitted with the positioning means.

With reference to the drawings, the positioning means comprises a GPS 1, a switch means 2, and a dog harness or jacket 3. The jacket 3 holds the GPS 1 and the switch means 2, and is worn by a search and rescue dog 4. The dog 4 is of a kind trained to search out a lost person, animal, article, or substance, and activate the switch means 2 on finding the person, animal, article, or substance. The switch means 2 may be sound sensitive so that it is activated by the dog barking to activate the GPS 1. When the GPS 1 is activated it records the position of the person, animal, article, or substance internally, or transmits a signal to identify the position of the person, animal, article, or substance. If the GPS 1 is of a kind which records the position internally then the dog 4 would travel back to a dog handler so that the position can be determined by taking a reading from the GPS 1. To encourage the dog to return to it's handler the invention may include a mechanism which gives an audible signal to the dog 4 once the position of the person, animal, article, or substance has been recorded.

In some forms of the invention the switch means 2 may not be sound sensitive, but rather may be activated through deliberate physical contact by the dog or by a person found by the dog. For example, the switch means 2 may comprise a pull mechanism having a tag 5 which the dog 4 can pull with its mouth to activate the GPS 1. The pull mechanism may include a cord 6 which joins the tag 5 to the rest of the switch means 2. The tag 5 could be pulled by the person found by the dog if that person is able to do so in cases where the tag 5 has not already been pulled by the dog. Alternatively the switch means 2 may comprise a button or the like which can be activated through deliberate contact by the dog's mouth, nose, or one of its paws. The invention may be formed so that when the switch means 2 is activated a transmitter (not shown) falls to the ground and is left there to send signals identifying the position of the person, animal, article or substance. The transmitter may form part of the above mentioned tag 5. In some forms of the invention the GPS 1 could be dispensed with so that search and rescue is dependent on the transmitter which falls to the ground.

Some forms of the invention may incorporate a sound or video image recorder (not shown) which is automatically activated when the switch means 2 is activated. The sound or video image recorder can then record sounds and/or images which may be useful to the dog handler or other search and rescue people.

In some embodiments of the invention the GPS 1 may be arranged to automatically record or signal its position at set periods, for example every 20 seconds, after it is first activated. The reason for this is that if the GPS 1 is unable to communicate with a satellite or satellites when it is first activated, it will at least record or send signals for nearby positions when satellite coverage is available as the dog returns to its handler or moves around for any other reason.

Some further embodiments of the invention may incorporate a homing signal device (not shown), for example a radio beacon, to enable the dog or invention to be located should the dog fail to return to its handler.

While some preferred forms or aspects of the invention have been described by way of example, it should be appreciated that modifications and improvements can occur without departing from the scope of the appended claims.

I claim:

1. Positioning means, comprising switch means which can be activated by a dog to cause the positioning means to at least one of record and transmit information that identifies the position of the positioning means, the switch means comprising:

a pull mechanism which can be pulled by the dog to activate the positioning means to at least one of record and transmit the information, the pull mechanism comprising a tag portion which can be pulled by the dog's mouth to activate the switch means.

2. Positioning means according to claim 1, wherein the positioning means comprises a GPS.

3. Positioning means according to claim 1, further comprising a sound sensitive mechanism which can be activated by the dog barking to activate the positioning means to at least one of record and transmit the information.

4. Positioning means according to claim 1, wherein the switch means can be activated in response to the dog barking in a certain way in terms of the frequency or volume of the barking.

5. Positioning means according to claim 1, arranged to automatically periodically at least one of record and transmit the information to identify the position of the positioning means once the switch means has been activated.

6. Positioning means according to claim 1, comprising a jacket or harness which can be worn by the dog to carry the rest of the positioning means.

7. Positioning means according to claim 1, comprising audible signal means arranged to give an audible signal to the dog when the switch means has been activated by the dog.

8. Positioning means according to claim 1, comprising transmitter means arranged to fall to ground level and send a position identifying signal when the switch means is activated.

9. Positioning means according to claim 1, wherein the positioning means is activated automatically by receiving a signal transmitted from a location remote from the positioning means.

10. A method of locating a person, animal, article, or substance, comprising the steps of:

a) fitting a positioning means to a dog, the positioning means being as defined in claim 1, and b) instructing the dog to search out the person, animal, article or substance so that the dog activates the switch means on finding the person, animal, article, or substance, such that the positioning means at least one of records and transmits information to identify the position of the person, animal, article, or substance.

11. A method according to claim 10, wherein the dog returns to a dog handler when the switch means has been activated.

12. A method according to claim 10, wherein the positioning means automatically and periodically at least one of records and transmits information to identify the position of the person, article, or substance when the switch means has been activated.

13. Positioning means, comprising switch means which can be activated by a dog to cause the positioning means to at least one of record and transmit information that identifies the position of the positioning means, the switch means comprising:

a pull mechanism which can be pulled by the dog to activate the positioning means to at least one of record and transmit the information, the pull mechanism comprising a length of flexible material which can be pulled by the dog's mouth to activate the switch means.

14. Positioning means according to claim 13, wherein the length of flexible material is a cord.

15. Positioning means according to claim 13, wherein the positioning means comprises a GPS.

16. Positioning means according to claim 13, further comprising a sound sensitive mechanism which can be activated by the dog barking to activate the positioning means to at least one of record and transmit the information.

17. Positioning means according to claim 13, wherein the switch means can be activated in response to the dog barking in a certain way in terms of the frequency or volume of the barking.

18. Positioning means according to claim 13, arranged to automatically periodically at least one of record and transmit the information to identify the position of the positioning means once the switch means has been activated.

19. Positioning means according to claim 13, comprising a jacket or harness which can be worn by the dog to carry the rest of the positioning means.

20. Positioning means according to claim 13, comprising audible signal means arranged to give an audible signal to the dog when the switch means has been activated by the dog.

21. Positioning means according to claim 13, comprising transmitter means arranged to fall to ground level and send a position identifying signal when the switch means is activated.

22. Positioning means according to claim 13, wherein the positioning means is activated automatically by receiving a signal transmitted from a location remote from the positioning means.

23. A method of locating a person, animal, article, or substance, comprising the steps of:
   a) fitting a positioning means to a dog, the positioning means being as defined in claim 13, and
   b) instructing the dog to search out the person, animal, article or substance so that the dog activates the switch means on finding the person, animal, article, or substance, such that the positioning means at least one of records and transmits information to identify the position of the person, animal, article, or substance.

24. A method according to claim 23, wherein the dog returns to a dog handler when the switch means has been activated.

25. A method according to claim 23, wherein the positioning means automatically and periodically at least one of records and transmits information to identify the position of the person, article, or substance when the switch means has been activated.

* * * * *